(12) United States Patent
Reinert, Sr.

(10) Patent No.: US 6,196,697 B1
(45) Date of Patent: *Mar. 6, 2001

(54) STAINLESS STEEL AIRPORT LIGHT SUPPORT APPARATUS AND METHOD

(76) Inventor: Gary L. Reinert, Sr., 639 North Ave., Pittsburgh, PA (US) 15209

(*) Notice: Subject to any disclaimer, the term of this patent is extended or adjusted under 35 U.S.C. 154(b) by 0 days.

This patent is subject to a terminal disclaimer.

(21) Appl. No.: 09/514,089

(22) Filed: Feb. 28, 2000

Related U.S. Application Data

(63) Continuation-in-part of application No. 09/118,980, filed on Jul. 10, 1998, now Pat. No. 6,033,083.

(51) Int. Cl.[7] .................................................... E01F 9/09
(52) U.S. Cl. ..................... 362/153.1; 362/145; 362/153; 362/285; 362/366; 362/418
(58) Field of Search ................................. 362/153.1, 153, 362/145, 285, 366, 418; 174/37, 48

(56) References Cited

U.S. PATENT DOCUMENTS

| | | | |
|---|---|---|---|
| 4,931,914 | * 6/1990 | Qiogue ................................. | 362/265 |
| 5,003,441 | * 3/1991 | Rowe et al. ........................... | 362/183 |
| 5,147,980 | * 9/1992 | Ferguson, Jr. .......................... | 174/37 |
| 5,156,454 | * 10/1992 | White .................................. | 362/153 |

* cited by examiner

*Primary Examiner*—Mohammad Y. Sikder
(74) *Attorney, Agent, or Firm*—Douglas G. Glantz

(57) ABSTRACT

A non-corrosive airport inset light adjustable alignment container set provides a light fixture and support for airport runway, taxiway, or other aircraft ground traffic areas, variable length extension means for rotatably adjusting height and azimuth by a vertical displacement, and stainless steel mounting means on the adjustable fixture extension for mounting the airport inset light on the rotatably adjustable fixture extension. For previously installed, old airport inset lights, a variable length extension assembly of the present invention can be connected to a fixed connecting flange for rotatably adjusting the height and azimuth alignment of a conventional, prior art airport inset light, e.g., one which has been previously installed without the benefit of the present invention. Rotation locking means are provided for securing the rotatable adjustment apparatus from further rotation. A novel top flange is adapted to receive various different designs of inset lights and to provide a stainless steel protection ring "mud dam."

20 Claims, 8 Drawing Sheets

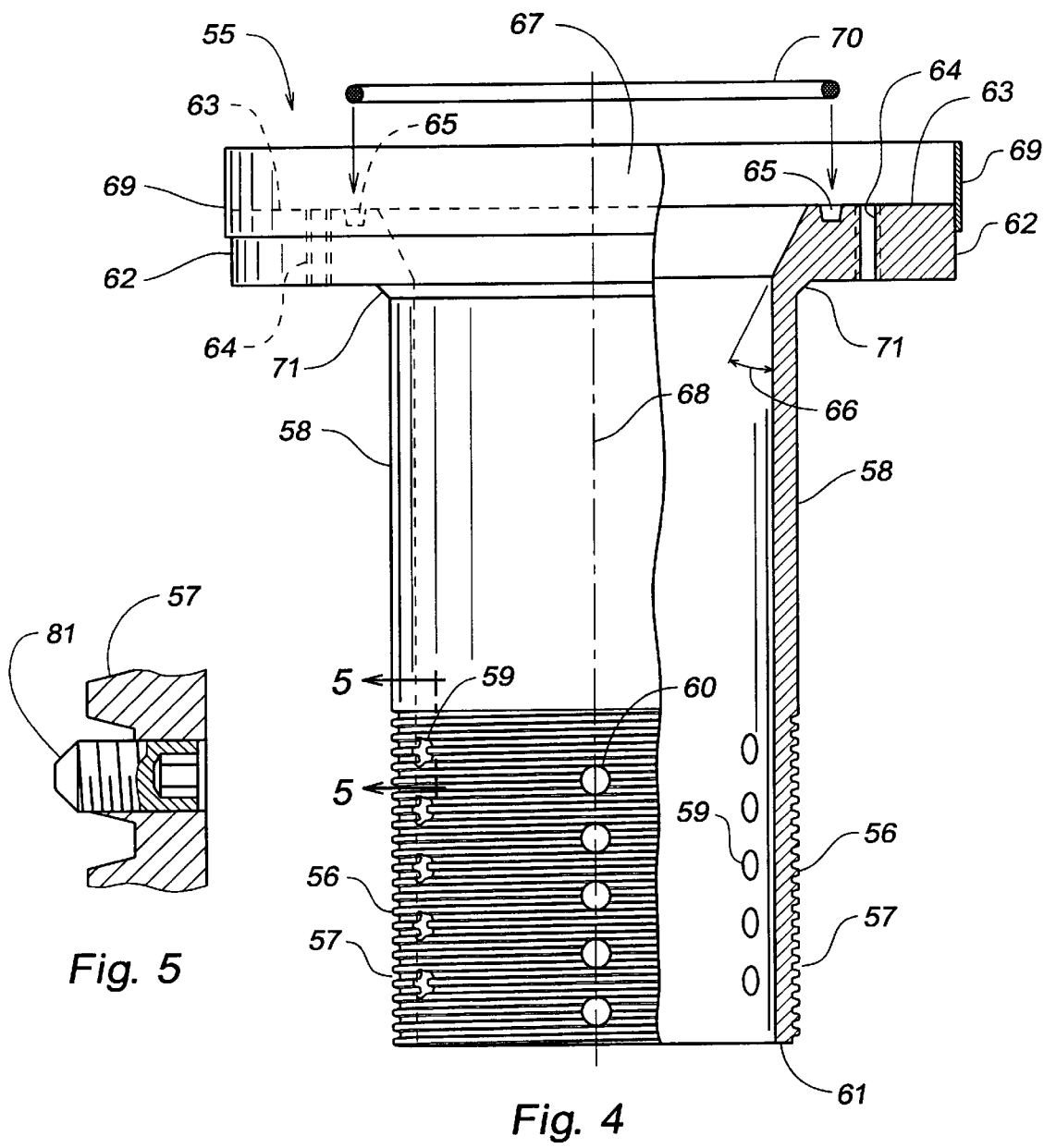
Fig. 5
Fig. 4
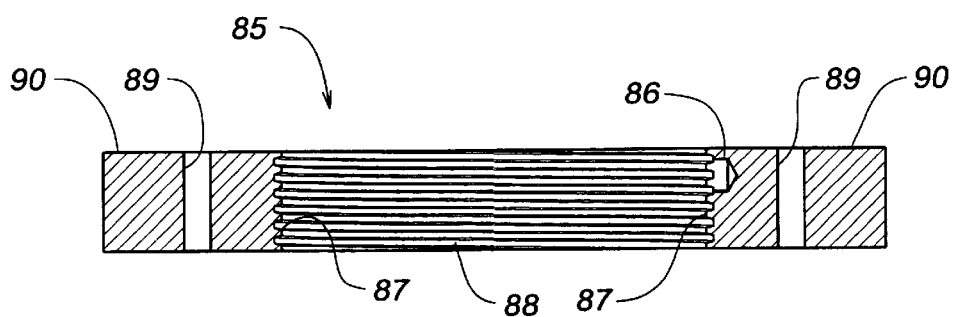
Fig. 6

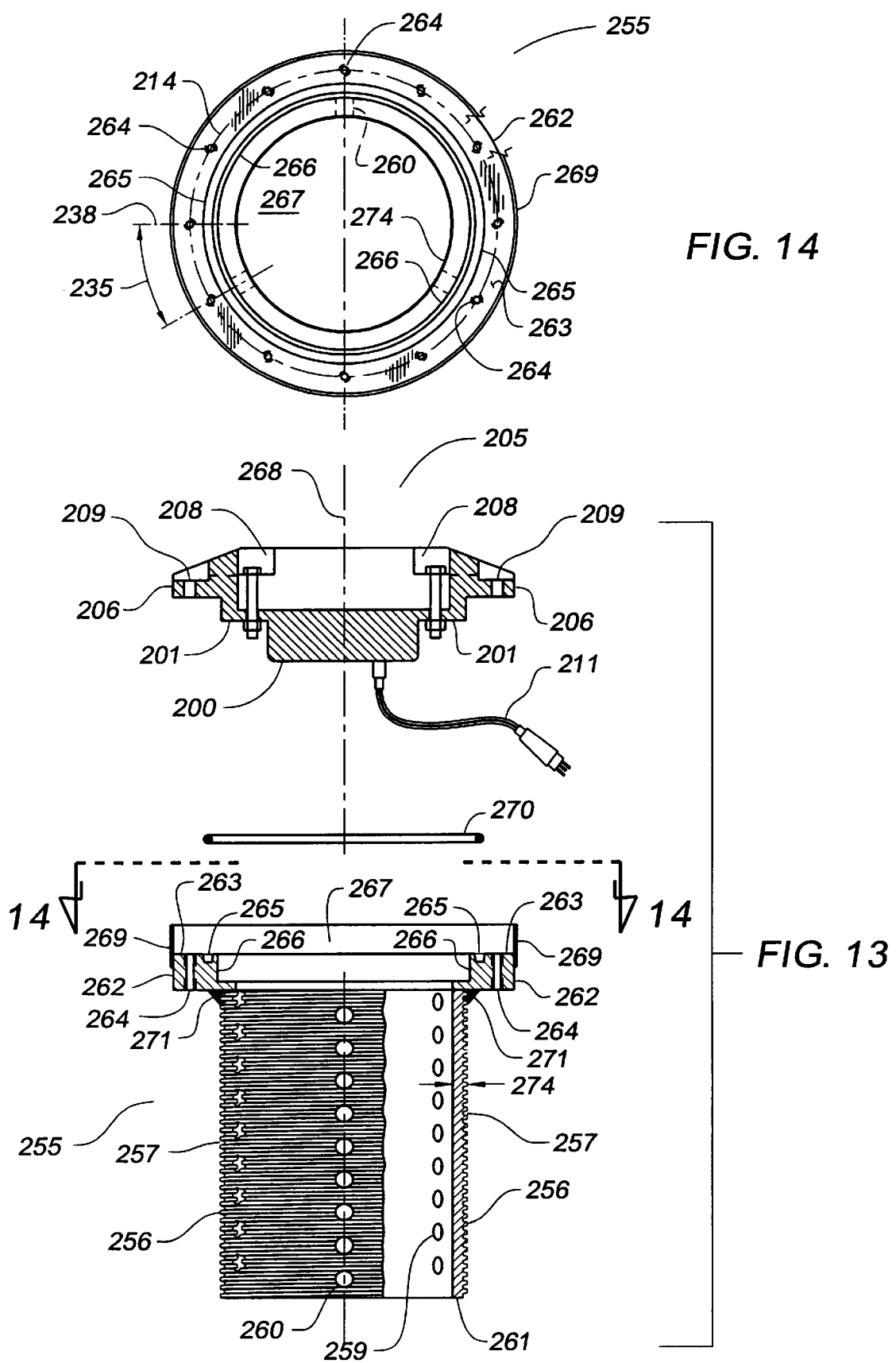

STAINLESS STEEL AIRPORT LIGHT SUPPORT APPARATUS AND METHOD

This application is a Continuation-In-Part of U.S. patent application Ser. No. 09/113,980 filed Jul. 10, 1998, now U.S. Pat. No. 6,033,083.

BACKGROUND OF THE INVENTION

1. Technical Field

This invention relates to airport runway light support apparatus and methods. In one aspect, this invention relates to height and azimuth adjustable container apparatus and methods for embedded container light supports for airport runways and the alignment of their light fixtures. In one aspect, this invention relates to adjustable airport runway lights and to apparatus and methods for specialized, set-in-the-ground lighting systems utilized for the purpose of guiding pilots during their approach to an airport runway and during the landing and taxi of aircraft. In one aspect, this invention relates to non-corrosive specialized, set-in-the-ground airport runway lighting systems.

2. Background

Conventional lighting fixtures forming part of specialized, set-in-the-ground airport runway lighting systems are mounted on certain steel containers. The steel containers for these airport runway inset lights can be one-part or two-part and, sometimes, three-part containers and are set below the surface of runways, taxiways, and other aircraft ground traffic areas. The bottom sections of the containers are sometimes called shallow light bases. The top sections are called fixed-length extensions and are manufactured in different fixed lengths and diameters. Flat spacer rings are installed between the extensions and the lighting fixtures for providing further height and azimuth adjustments. These conventional steel containers, in addition to serving as bases for mounting the lighting fixtures, also serve as transformer housings and junction boxes to bring electrical power to the lighting fixtures.

In the installation of airport runway touchdown zone, centerline, and edge lighting systems, as well as in the construction or installation of taxiway centerline and edge lighting systems, and other lighting systems, these containers are embedded in the runway, taxiway, and other pavements at the time the runway and taxiway pavements are poured (concrete) or placed (bituminous). These containers, hereinafter referred to as embedded containers, vary in length and diameter. Conventional embedded containers provide an inverted flange at their top portion, which flange has a standard set of threaded holes to allow for the runway, taxiway, edge, and other light fixtures to be bolted onto them above the pavement surface, or to allow for the top section of the container to be bolted onto the bottom section, if it is a two-section container. A great majority of these existing, conventional containers are two section containers, bolted together at their inverted flanges. The light fixture then is bolted onto the top inverted flange of the top section of the two-section container. The top section of the two-section container is referred to as the fixed-length extension, which is part of the conventional embedded containers.

The top portions of the lighting fixtures are installed at a close tolerance, slightly above the pavement surface. Installations of the containers and their lighting fixtures are required on two different occasions. The first is when the runways, taxiways, and other aircraft ground traffic areas are built for the first time. The second is for resurfacing or repaving of the runways, taxiways, and other aircraft ground traffic areas. The latter is the most common, i.e., most frequent.

The light fixtures installed on the embedded containers, otherwise known as airport inset lights, have to be aligned with respect to each other in a precise, straight line on the horizontal plane known as azimuth correction, and their height has to be set within a fixed, strict tolerance measured from the pavement surface.

Each airport paving project may consist of installing hundreds or thousands of lighting fixtures and their airport inset light containers.

Runways, taxiways, and other aircraft ground traffic areas deteriorate with years of usage. This creates the need for resurfacing or repaving, i.e., replacing the asphalt of these ground surfaces. Repavement is a much more common, i.e., frequent, occurrence than the construction of new pavements.

When a runway, taxiway, or other aircraft ground traffic area is first built, or when upgrading or modernizing, or when maintenance projects require their resurfacing (repavement), the flanges on the embedded containers get buried under the pavement. This creates the need for height adjusting devices with flanges identical to those of the embedded containers to adapt the container up to the final surface and for the lighting fixtures to be installed and aligned above the payment. In many instances, this requires core-drilling the newly poured or placed pavement to reach down to the now buried top flange of the embedded container.

Depending on the lengths of the runways and taxiways, thousands of these embedded containers are affected, and a wide variety of height adjustments can be involved for each given size of embedded containers. In such an adjustment system, fixed-length extensions must be made available in many different lengths, so as to provide the many different gross height adjustments. A combination of one or more flat spacer rings, which are manufactured in thicknesses of $\frac{1}{16}$, $\frac{1}{8}$, $\frac{1}{4}$, and $\frac{1}{2}$ inch (1.6, 3.2, 6.3, and 12.7 millimeters, approximately), and other thicknesses, can be used to provide the final height.

These fixed-length extensions have one inverted flange on each end to bolt onto the embedded container, and then flat rings are added on top of the fixed-length extension top flange before the lighting fixture is bolted onto the flange.

The fixed-length extensions and the flat spacer rings must be individually ordered to the required length. This adjustment system makes for a difficult and tedious conventional installation procedure involving (1) field measurement of each individual fixed extension length and flat spacer ring required for every container; (2) record keeping of all those field measurements and locations for ordering and verification; (3) ordering, receiving, and delivering to the field each size according to its location; and (4) frequently having to install more than one flat spacer ring to achieve the required height. The listed complications for the difficult conventional installation procedure are further magnified by the fact that the embedded containers are made in 4 different sizes: 10, 12, 15, and 16 inches (25.4, 30.5, 38.1, and 40.6 centimeters, approximately) in diameter.

These embedded containers below the pavement surface serve as light fixture bases. They also serve as transformer housings and junction boxes.

INTRODUCTION TO THE INVENTION

Depending on the location where these containers are installed, they are exposed to varying degrees and types of corrosive chemicals and materials applied to them by the aircraft and other vehicular traffic in that location. For example, runway and taxiway light fixtures, and the containers they are bolted onto, are subjected to rain water and to chemicals such as chemicals applied to the aircraft for the purpose of deicing.

It is therefore an object of the present invention to provide non-corrosive apparatus and method for mounting an airport runway light and adjusting with precision and simplicity the height and the azimuth of a runway embedded container and for aligning with efficiency, simplicity, and precision a lighting fixture installed upon the non-corrosive apparatus of the present invention.

A further object of the present invention is to provide non-corrosive apparatus and method for adjusting the height of a runway embedded container without having to install individual fixed-length extensions or flat spacer rings.

A still further object of the present invention is to provide non-corrosive apparatus and method for adjusting the height and azimuth of an array of airport runway embedded containers in a lighting system without having to install individual fixed-length extensions or flat spacer rings.

It is an object of the present invention to provide non-corrosive apparatus and method for adjusting with precision and simplicity the height and the azimuth of a conventional container, previously installed and embedded as an airport inset light, and for aligning with efficiency, simplicity, and precision a lighting fixture installed upon the apparatus of the present invention.

It is a further object of the present invention to provide an alignment adjustments assembly that does not require the installation of a separate mud dam.

It is a further object of the present invention to provide a non-corrosive alignment adjustments assembly that does not require the installation of a separate mud dam.

A further object of the present invention is to provide non-corrosive apparatus and method for adjusting the height of a prior art or conventional container, previously installed and embedded as an airport inset light, without having to install individual fixed-length extensions or flat spacer rings.

A still further object of the present invention is to provide non-corrosive apparatus and method for adjusting the height and azimuth of an array of conventional containers, previously installed and embedded as airport inset lights, in a lighting system without having to install individual fixed-length extensions or flat spacer rings.

It is an object of the present invention to provide a non-corrosive alignment adjustments assembly which corrects the problem of tilting of the assembly from the vertical axis which increases the angle at which the light beam from an inset lighting fixture is projected, diverting the light beam away from incoming airplanes.

It is also another object of this invention to provide a non-corrosive alignments adjustments assembly which corrects the problem of the rotation of the assembly which alters the azimuth alignment of the lighting fixture, which in turn would impede the pilot of an incoming airplane from seeing the light.

It is yet another object of the present invention to provide a non-corrosive alignments adjustments assembly which will allow the longer, angled bottom type inset lights be installed upon it.

It is yet a further object of the present invention to provide a non-corrosive alignment adjustments assembly which does not require installing a separate flat spacer ring, with a groove on its top flat side.

These and other objects of the present invention will become apparent to those skilled in the art from a careful review of the detailed description which follows.

SUMMARY OF THE INVENTION

Novel non-corrosive airport inset light adjustable alignment container set apparatus and method of the present invention include a light fixture and support for airport runway, taxiway, or other aircraft ground traffic areas, variable length extension means for rotatably adjusting height by a vertical displacement, and stainless steel mounting means on the adjustable fixture extension for mounting the airport inset light on the rotatably adjustable fixture extension. Rotation locking means are provided for securing the rotatable adjustment apparatus from further rotation. A novel top flange is adapted to receive various different designs of inset lights and to provide a stainless steel protection ring "mud dam."

BRIEF DESCRIPTION OF THE DRAWINGS

FIG. 1 also shows a concrete encasement and three layers of pavement.

FIG. 4 is an elevation view, partially in section, of the adjustable extension component of the present invention showing a mud dam and an "O" ring with its groove.

FIG. 5 is an elevation view, partially in section, showing an Allen-set screw component of the present invention.

FIG. 6 is an elevation view, partially in section, of the adapter flange component of the present invention.

FIG. 11 also shows an airport inset lighting fixture mounted on the adjustments assembly.

FIG. 13 is an elevation view, partially in section, of the universal top adjustment container of the present invention and shows an airport inset lighting fixture and an "O" ring.

FIG. 14 is a plan view, i.e., a top view, of the universal top adjustment container of the present invention as shown in FIG. 13 without the lighting fixture.

DETAILED DESCRIPTION

Figure 1:
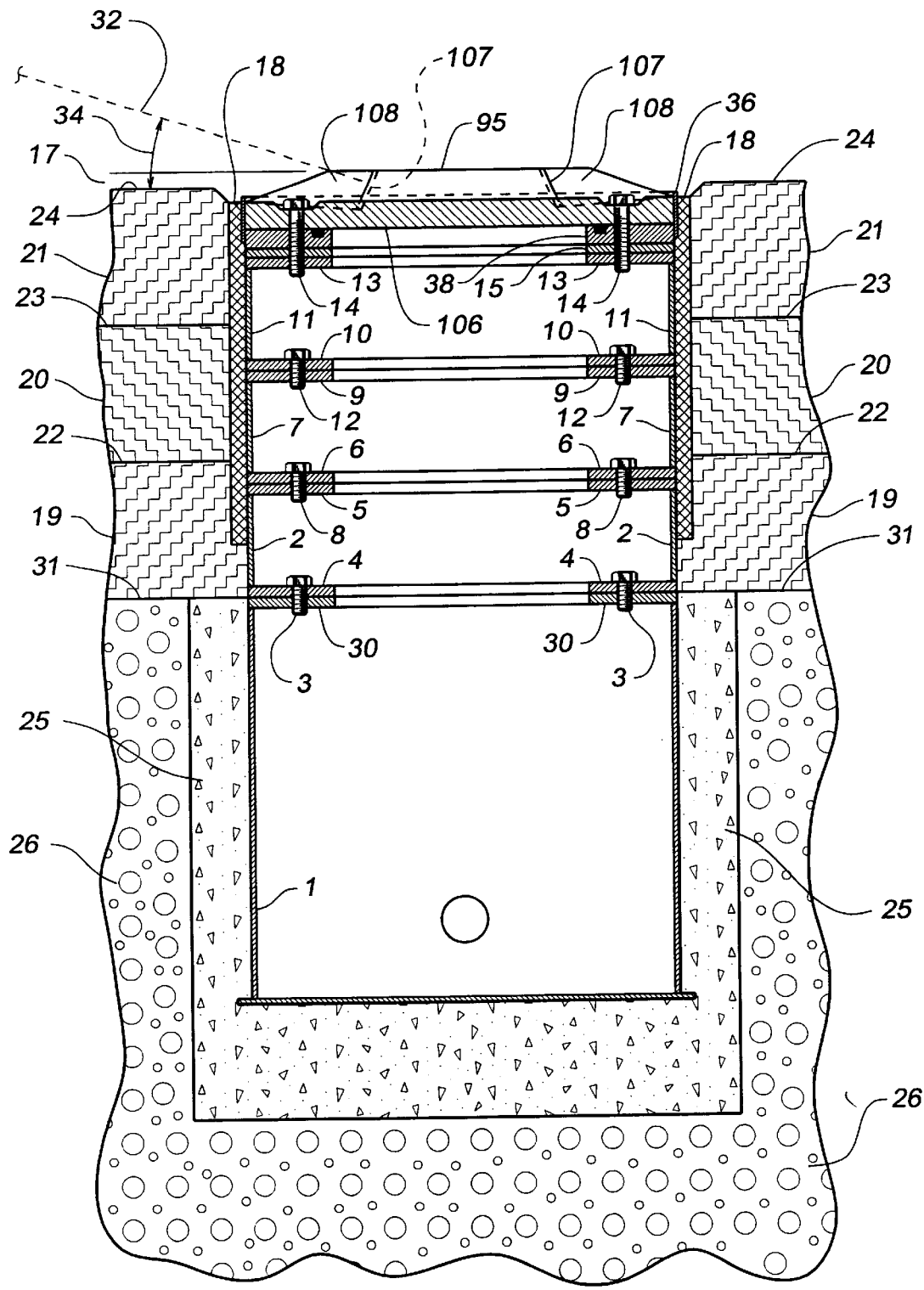
FIG. 1 is an elevation view, partially in section, of the existing fixed-length extensions installed on a conventional embedded container and a lighting fixture installed thereon.

The present invention provides a height and azimuth adjustable container set, utilized for all the purposes conventional embedded containers are utilized, i.e., to serve as bases for lighting fixtures, as transformer housings, and as junction boxes, but with a major difference from conventional embedded containers. The adjustable container sets of the present invention also are utilized for the precise and simplified, economic mounting and adjusting of the height of the lighting fixture to be mounted upon it. Also, the adjustable containers of the present invention provide for precise and simplified, economic aligning of the azimuth of the lighting fixtures and aligning the lights with respect to each other, by virtue of the azimuth alignment.

The adjustable container set of the present invention is used to improve existing containers, while being efficiently and economically adjustable. These containers are installed in airport runways, taxiways, and other aircraft ground traffic areas to serve as bases for lighting fixtures, transformer housings, and junction boxes. The adjustments take place when the containers and their lighting fixtures are initially installed, e.g., when new runway, taxiway, and other aircraft ground traffic areas are first built and every time they are repaved.

The present invention provides a height and azimuth alignments adjustments assembly utilized for the more economic, precise, and simplified adjusting of the heights of concrete embedded containers and the azimuth alignment of airport inset lighting fixtures mounted thereon. These containers of the present invention are installed and reused in airport runways and taxiways and other aircraft ground traffic areas to serve as bases for lighting fixtures, transformer housings, and as junction boxes.

In the actual testings and installations of the alignments adjustments assembly disclosed and described in U.S. patent application Ser. No. 08/002,014 filed Jan. 8, 1993 and entitled "Alignments Adjustments Assembly Apparatus and Method," now U.S. Pat. No. 5,541,362, I have discovered certain aspects which could be modified.

One drawback is that airport runway light bolts used to install the airport runway light on or in the airport runway light support can be part of a corrosion problem. Corrosive materials such as deicing chemicals used on the aircraft can accelerate corrosive problems between the light bolts and the light support. The airport runway light stainless steel bolts can accelerate corrosive attack by a galvanic action between dissimilar metals.

The present invention provides an alignment adjustments assembly which corrects the problem of corrosion.

One drawback is that a great number of the existing conventional, fixed-length extensions installed as stacked-on embedded containers have tilted from their vertical axis. This tilting, which at the place of tilting is relatively small, nevertheless increases the angle at which the light beam from an inset lighting fixture is projected, thereby diverting the light beam away from incoming airplanes. At one-half mile (1 kilometer) away from the approach area, it is difficult for the pilot of a landing airplane to see the light because of the very large divergence at that point from the point at which it should otherwise be, when properly height-adjusted.

The present invention provides an alignment adjustments assembly which corrects the problem of tilting.

Another drawback encountered is that the new larger and heavier airplanes, now becoming more common, exert a larger torsional force upon the inset lighting fixtures. Tests made to simulate those larger torsional forces on the alignment adjustment assembly disclosed and described in U.S. patent application Ser. No. filed Jan. 8, 1993 and entitled "Alignments Adjustments Assembly Apparatus and Method," now U.S. Pat. No. 5,541,362, proved that a very slight rotational movement occurs, even though considered relatively insignificant today. Nevertheless, even heavier airplanes could provide a more significant rotational movement that would alter the azimuth alignment of the lighting fixture, which in turn would impede the pilot of an incoming airplane from seeing the light.

The present invention provides an alignments adjustments assembly which corrects the problem of the rotation of the assembly.

Yet another drawback encountered is the need to install a separate component called the mud dam, consisting of a flat, three-quarters inch (19 mm) thick spacer ring with a flat, thin steel band welded all around the periphery of the flat spacer ring. This band is about one and a quarter inches (3.3 cm) wide.

The present invention provides an alignment adjustments assembly that does not require the installation of a separate mud dam.

A further drawback encountered is that there are two types of inset light construction with respect to its bottom side. The bottom on one type is short and flat. The bottom on the other is longer and at an angle with respect to the light base vertical axis. The longer, angled bottom does not allow the light to fit properly on the top flange of the apparatus as disclosed and described in U.S. patent application Ser. No. 08/002,014 filed Jan. 8, 1993 and entitled "Alignments Adjustments Assembly Apparatus and Method," now U.S. Pat. No. 5,541,362.

The present invention provides an alignments adjustments assembly which will allow the longer, angled bottom type inset lights to be installed upon it.

Yet a further drawback encountered is that, in a great many occasions, an "O" ring seal is specified. In such cases, a separate flat, three-quarters inch (19 mm) thick spacer ring, with a groove on its top flat side, is installed between the fixed-length extension and the lighting fixture.

The present invention provides an alignment adjustments assembly which does not require installing a separate flat spacer ring with a groove on its top flat side.

The invention includes an existing embedded container with an inverted flange on one end onto which an adapter flange bolts. The adapter flange has Acme threads in its center aperture. The apparatus and method of the present invention also include an outside Acme threaded adjustable extension, which threads down into the adapter flange, to provide the precise height required and the precise alignment of its lighting fixture. The adjustable height extension has a top flange to provide a base upon which the specified lighting fixture can be bolted.

The present invention provides height and azimuth light support sets utilized for the more efficient and economic, precise, and simplified adjusting of the heights of exiting art embedded containers and the alignment of their light fixtures. These containers are installed in airport runways and taxiways to serve as bases for lighting fixtures, as transformer housings, and as junction boxes.

Figure 2:
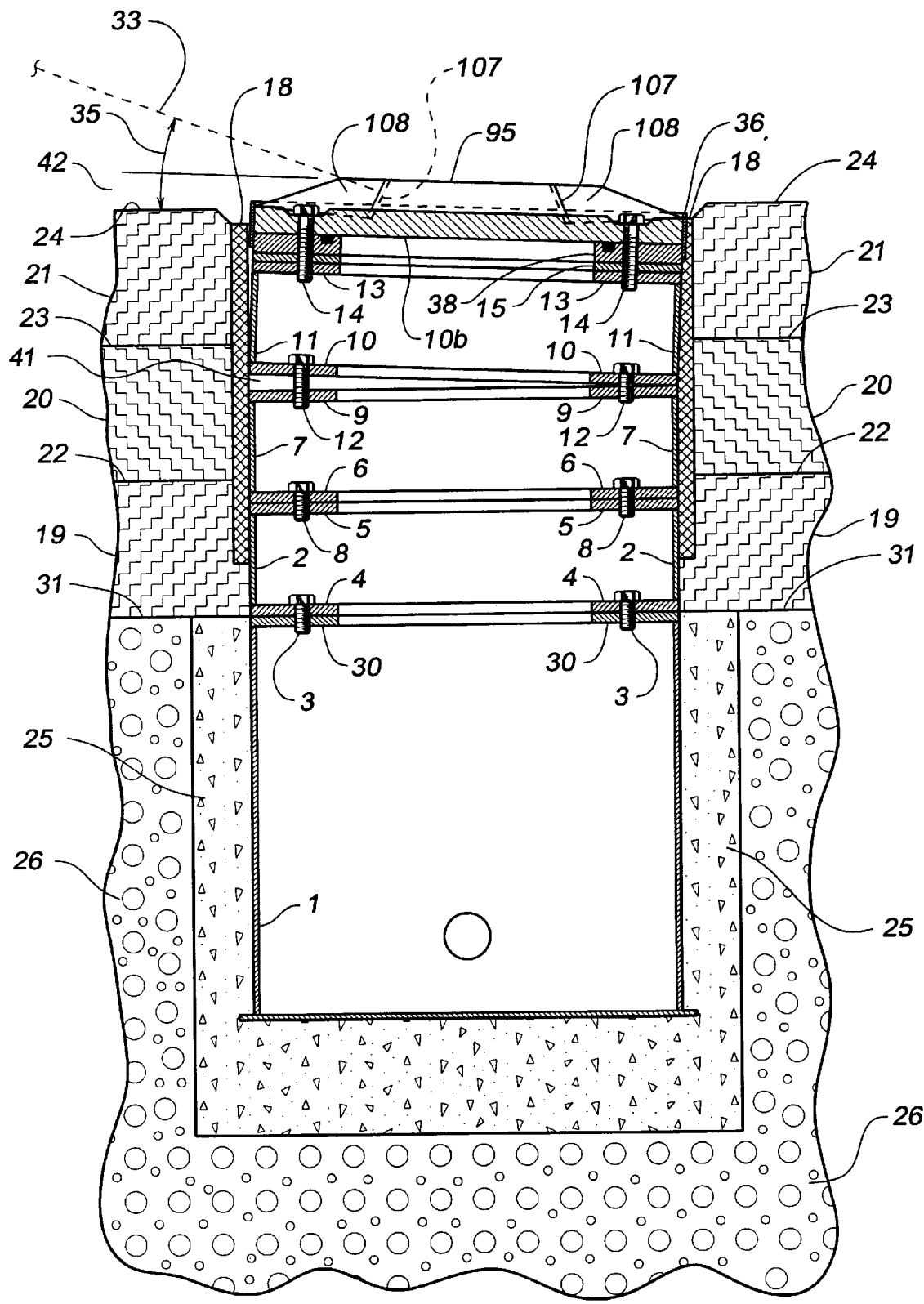
FIG. 2 is an elevation view, partially in section, of the same existing fixed-length extensions of FIG. 1 but now shown tilted.

Referring now to FIGS. 1 and 2, an existing art container 1 is represented schematically with three fixed-length extensions 2, 7, and 11 bolted together. Container 1 is embedded in concrete 25 at the time an airport runway, taxiway, and other aircraft ground traffic areas (hereinafter aircraft ground traffic areas) are first built. These ground traffic areas are generally built upon a compacted granular sub-base 26.

Figure 7:
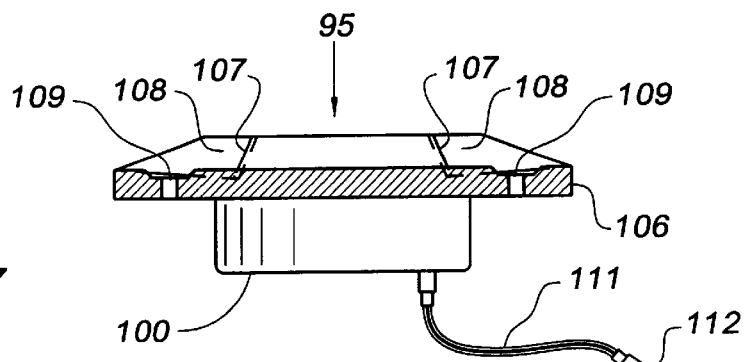
FIG. 7 is an elevation view, partially in section, of an airport inset lighting fixture, showing a straight bottom.
Figure 12:
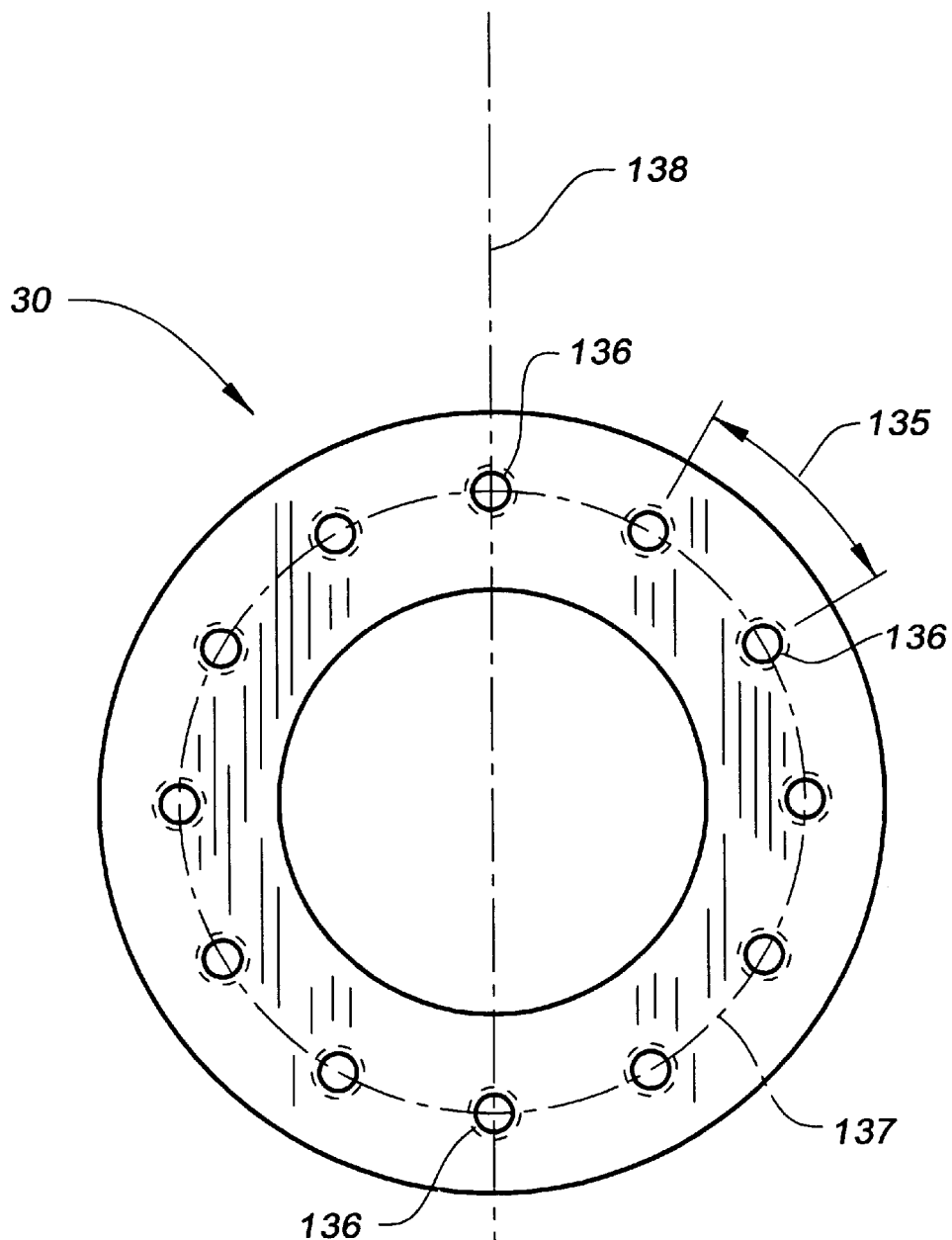
FIG. 12 is a plan view of the top flange of the conventional embedded container of FIGS. 1, 2, and 11.

Conventional steel containers 1, in addition to serving as bases for mounting airport inset lighting fixtures 95 also serve as transformer housings and junction boxes to bring electrical power to lighting fixture 95, as shown in FIGS. 1, 2, and 7. Fixed-length extension 2 is bolted to top flange 30 on container 1, which has 12 threaded bolt holes 136, as shown in FIG. 12, by means of its bottom flange 4 and bolts 3. Fixed-length extension 2 is bolted to bottom flange 6 of fixed-length extension 7 by means of its top flange 5 and bolts 8. Fixed-length extension 7 is bolted on top of fixed-length extension 2.

Fixed-length extensions have twelve bolt holes in both of their flanges, i.e., top flange 5 and bottom flange 4 of extension 2, as shown in FIG. 1. The bolt holes, not shown, on the top flanges of the extensions are threaded, while the bolt holes, not shown, on the bottom flange are not threaded. Nevertheless, the bolt holes in both flanges of the fixed-length extensions are on a bolt hole circle diameter identical to bolt circle diameter 137, as shown in FIG. 12, of container 1.

Fixed-length extension 7 is bolted to bottom flange 10 of fixed-length extension 11 by means of its top flange 9 and bolts 12. Fixed-length extension 11 is bolted on top of fixed-length extension 7.

Fixed-length extensions provide only a gross height adjustment. One or a plurality of flat spacer rings 15 are required for providing the more precise final height adjustment.

Figure 10:
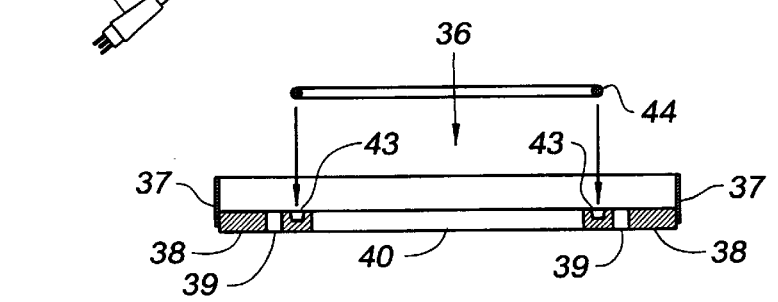
FIG. 10 is an elevation view, partially in section, of a mud dam protection ring.

Flat spacer rings 15 are installed on top flange 13 of fixed-length extension 11, as shown in FIG. 1, i.e., the top fixed-length extension, to provide the final height adjustment 17 for inset lighting fixture 95. Flat spacer rings 15 can be one or more. They are fabricated as thin as 1/16 inch (1.6 mm) and as thick as three-quarters inch (19 mm) or thicker. Mud dam 36, as shown in FIGS. 1 and 10, comes next on top of spacer rings 15. The inset lighting fixture 95 is bolted together with flat spacer rings 15 and mud dam 36 onto the top flange 13 of the top fixed-length extension 11 by means of bolts 14.

Continuing to refer to FIGS. 1 and 2, several layers of pavement 19, 20, 21 are shown, to exemplify the fact that fixed-length extensions 2, 7, and 11 are utilized for height adjustments every time an aircraft ground traffic area is first built or upgraded by the installation of new pavement, i.e., each new layer of pavement 19, 20, and 21. The new layers create new surfaces 22, 23, and 24 and therefore new heights.

These airport aircraft ground traffic area upgrades create the need for heights adjusting devices, with flanges identical to those of the embedded container 1, in order to adapt the container 1 to the new surface, i.e., the new height and further in order for the lighting fixture 95 to be installed slightly above the new pavement surface, i.e., surface 22, 23, or 24, at a close tolerance 17 above new pavement surface 24, for example.

In order to seal pavement layers 19, 20, 21 around container 1, grout 18 is utilized. Pavement rings 36, commonly known in the industry as mud dam 36, as shown in FIGS. 1 and 10, are installed on top of spacer rings 15 to protect lighting fixture 95 from being splashed by the grout 18 at the time of its application.

Inset lighting fixture 95 is set inside mud dam protection ring 36, as shown in FIG. 10. Mud dam 36 consists of a flat ring 38, as shown in FIG. 10, generally of ¾ inch (19 mm) in thickness, with a 1 to 1¼ inch (2.54 to 3.27 cm) wide, flat, thin steel band welded around the periphery of flat ring 38. Flat ring 38 has bolt holes 39 which match bolt holes, not shown, on flat spacer rings 15, on fixed-length extension 11 as well as on lighting fixture 95. Bolt holes on fixed-length extension 11 are threaded. Lighting fixture 95 is bolted onto fixed-length extension 11, together with mud dam 36 and flat spacer rings 15 by means of bolts 14. Mud dams 36 are generally provided with grooves 43 in order to accept "O"-ring gasket 44.

When any one layer of pavement is first placed, it is done by placing it over the entire surface, i.e., surface 31. Then the pavement 19 is core-drilled at the location of each container 1 to remove the pavement at that location to install fixed-length extension 2, any flat spacer ring 15, mud dam 36, and finally lighting fixture 95 at the new height created by pavement 19 and surface 22, by way of example. This process is repeated every time a new layer of pavement is added, i.e., for further layers 20 and 21. The core drilled hole is larger in diameter than the diameter of container 1, hence the requirement to utilize grout 18 to fill in the void and therefore the need to install a mud dam 36, as shown in FIG. 10, to protect lighting fixture 95, as shown in FIGS. 1, 2 when grout 18 is poured.

A new method has been used for a few years already, whenever an aircraft ground traffic area reconstruction takes place, i.e., resurfacing or repaving. Instead of adding a new layer of pavement on top of the last one installed, the last one layer, i.e., pavement layer 21, is milled down by large roto-milling machines. This method is extensively explained in my U.S. Pat. No. 5,431,510 entitled "Overlay Protection Plate Apparatus and Method."

Prior to roto-milling the pavement top layer, i.e., layer 21, the lighting fixtures, any spacer rings, the mud ring, and the top, existing fixed-length extensions have to be removed. An overlay protection plate, not shown, is bolted to top flange 30, on container 1, to prevent debris from falling into container 1. After roto-milling, a new layer of pavement is installed, and the new pavement is core-drilled at the location of each container 1 to replace the items removed back to their original position. Core drilling at each embedded container location is done to provide access for reinstalling the items previously removed. Nevertheless, in a great percentage of the cases, i.e., at each of the individual container locations, differences of height occur, creating the need for the installation of additional flat spacer rings 15 on top of the ones removed and being reinstalled.

Figure 3:
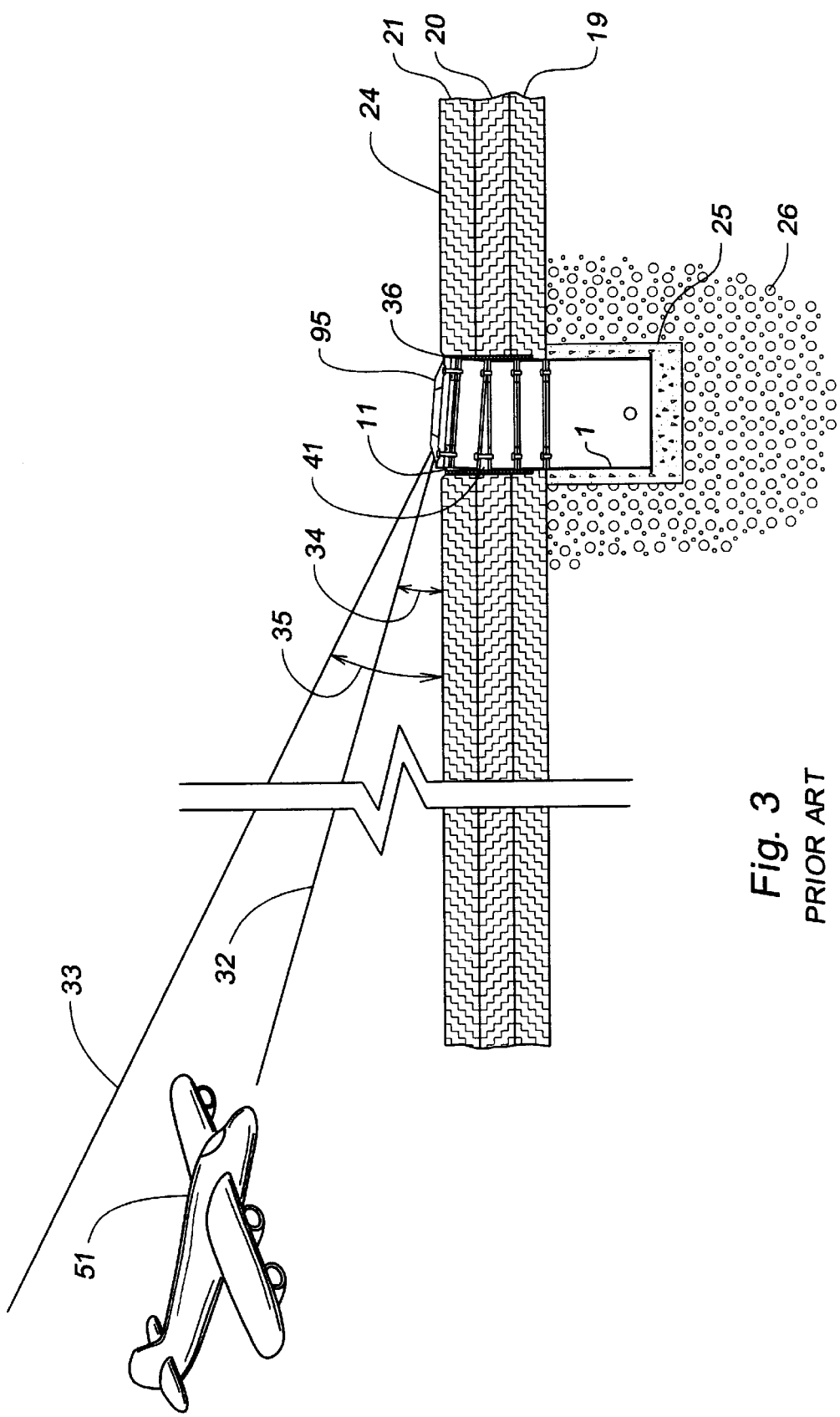
FIG. 3 is a pictographic view, partially in section, showing a landing passenger jet airplane, a runway, and a tilted runway centerline inset lighting fixture.

Referring to FIGS. 1 and 2, lighting fixture 95 is installed at a close tolerance 17 slightly above pavement surface 24. The optical system, not shown, inside the lighting fixture, projects its light beam 32 through lens 107 in window 108 of lighting fixture 95 at a precise angle 34 from surface 24 to allow a pilot landing aircraft 51, as shown in FIG. 3, see light beam 32, from a distance of about one-half mile (1 kilometer), when landing at night or under other low visibility conditions. Lighting fixtures 95 are also known as centerline lights because they are installed on the embedded containers in the center of the aircraft ground traffic areas, i.e., runways, taxiways, and others.

The continuous landing of aircraft, day and night, year after year, on top of these lighting fixtures can provide a slight tilting 41, as shown in FIG. 2, of the lighting fixture and fixed-length extension 11, as represented by 41 (not to scale), as shown in FIG. 2, for the purpose of making this explanation more clearly understood. This tilting 41 will alter the installed height tolerance 17, as shown in FIG. 1, which now would be larger as represented by 42 in FIG. 2. The maximum installed height tolerance 17 is 1/16 inch (1.6 mm), per F.A.A. (U.S. Federal Aviation Administration) specifications. Tilting 41 is shown as a separation of flange 10 of fixed-length extension 11 from flange 9 of fixed-length extension 7.

Even the slightest tilting of lighting fixture 95 and the associated extension produces an angular deviation, angle 35, as shown in FIGS. 2 and 3, which is larger than the precise angle 34 obtained by a combination of the precise height adjustment of Lighting fixture 95 and the angle at which light beam 32 is emitted from lighting fixture 95, through its lenses 107, in windows 108, as shown in FIGS. 1 and 2. This lighting fixture emitted light beam angle is set at the factory and is precisely established by F.A.A. regulations.

An increased angle 35 would project emitted light beam 33 away from a line of sight from the pilot when landing aircraft 51, as shown in FIG. 3, as it descends for landing. As a result, the pilot of aircraft 51 would not be able to see light beam 33 when landing at night or during poor visibility conditions. An increase in the height adjustment 17 of lighting fixture 95 would have the same effect, i.e., the light beam would not be visible to the pilot at landing. In addition, an increased installed height creates the danger of the lighting fixture being plowed-off, during winter time, when snow is regularly plowed off airport ground traffic areas. This creates the danger of lighting fixtures, bolts, rings, and other components, being thrown onto these traffic areas, with the resulting danger to landing aircraft.

Conventionally, tilting is field-corrected by installing a thick tapered spacer ring, not shown. These tapered rings are custom made, per field measurement, and they are installed after first removing some of the existing flat spacer rings 15, to correct angular deviation 35 of light beam 33 to the correct angular adjustment 34 of the light beam. Tilting of the fixed-length extension is corrected, when the apparatus and methods of the present invention are utilized, because fixed-length extensions, bolted one on top of the other are no longer required.

Figure 8:
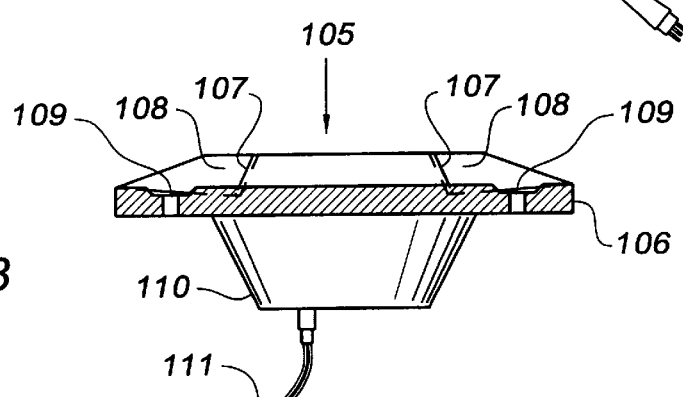
FIG. 8 is an elevation view, partially in section, of an airport inset lighting fixture, showing an angled bottom.
Figure 9:
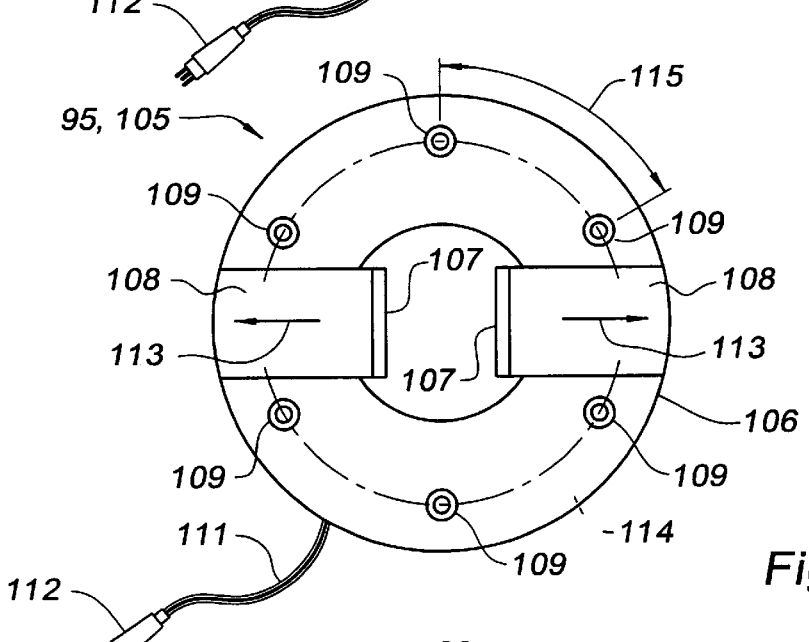
FIG. 9 is a plan view of the lighting fixture of FIG. 7 and of FIG. 8.

Referring to FIGS. 7, 8, and 9, lighting fixtures today are manufactured with two different types of bottom portions.

FIG. 7 shows lighting fixture 95 with six non-threaded, counter sunk bolt holes 109 drilled through mounting flange 106. Bolt holes 109 are set apart at an angle 115 of 60 degrees one from another, in bolt circle 114. Lighting fixture 95 is provided with optical lenses 107 in countersunk windows 108 and with a flat, short, straight down bottom portion 100. Electrical wires 111 and connector 112 are provided for bringing electrical power to lighting fixture 95 from an isolation transformer, not shown, in conventional container 1, as shown in FIGS. 1 and 2.

Lighting fixture 105 of FIG. 8 has six non-threaded, countersunk bolt holes 109 drilled through mounting flange 106. Bolt holes 109 are set apart at an angle 115 of 60 degrees one from another, in bolt circle 114. Lighting fixture 105 is provided with optical lenses 107 in countersunk windows 108 and with a long, angled bottom 110, hence the novel angled 66 opening 67 of adjustable extension 55, as shown in FIG. 4. Angled 66 opening 67 allows lighting fixture 105 to be installed on flange 62 of the extension, in addition to allowing also the installation of lighting fixture 95, as shown in FIG. 7.

Continuing to refer to FIG. 8, lighting fixture 105 is also provided with wires 111 and connector 112 for bringing electrical power to lighting fixture 105 from conventional embedded container 1, as shown in FIGS. 1 and 2.

Azimuth orientation arrows 113 are engraved on mounting flange 106 in the countersunk windows 108 area. Arrows 113 are also engraved in countersunk windows 108 of lighting fixture 95. The difference between lighting fixture 95 and lighting fixture 105 is in the short, flat bottom portion 100 of fixture 95 versus the longer, angled bottom portion of fixture 105.

Engraved azimuth arrows 113 are required for aiding a lighting fixture installer in orienting lenses 107, on windows 108, directly to the exact azimuth alignment, to correctly align, in azimuth, the light beam projected through lenses 107 with the aircraft landing direction. The azimuth alignments are required when the lighting fixture is first installed and on every occasion maintenance is performed on the fixture, i.e., removal for bulb change and others.

FIG. 9 is a top view, i.e., a plan view, of the lighting fixtures of FIGS. 7 and 8. The lighting fixtures 95, 105 have six countersunk bolt holes 109 each on bolt circle 114, with a bolt circle diameter identical to the diameter of the bolt circle, not shown, of bolt holes 64, on top flange 62, as shown in FIG. 4.

The bolt circle diameter, the number and size of bolts and bolt holes in the lighting fixtures, as well as in the flange where the lighting fixtures are to be installed, i.e., top flange 62, as shown in FIG. 4, or in conventional top flange 13, as shown in FIG. 1, are specified by specifications known as Circulars, issued by the F.A.A.

Referring now to FIGS. 4, 5, and 6, adjustable extension 55 and adapter flange 85 represent the preferred embodiment of the alignments adjustments assembly of the present invention.

Adjustable extension 55 consists of a tubular, cylindrical section, defined by a non-threaded top portion 58 which has its bottom portion 57 threaded with Acme threads 56, e.g., by way of example at four threads per inch (2.54 cm). Top portion 58 and bottom threaded portion 57 are the wall of the cylindrical portion, i.e., the wall of a tubular cylinder, shown in elevation, partially in section, in FIG. 4.

Acme threaded portion 57 is threaded for approximately six inches (15 cm) from bottom end 61. Threaded portion 57 has a minimum of six vertical rows of threaded holes 59, 60, i.e., parallel to its vertical axis 68, as opposed to three vertical rows of holes at 120 degrees apart, disclosed in U.S. patent application Ser. No. 08/002,014 filed Jan. 8, 1993 entitled "Alignments Adjustments Assembly Apparatus and Method," now U.S. Pat. No. 5,541,362. Holes 59 are on a horizontal plane different from holes 60, i.e., intercalated, i.e., staggered as shown in FIG. 4, so that at all times there will be a minimum of four and a maximum of six holes 59, 60 for threading Allen set-screws 81, as shown in FIG. 5, through them and for tightening against inside threaded surface 87 of adapter flange 85, as shown in FIG. 6. By the method of the present invention, at least one Allen set-screw 81, as shown in FIG. 5, protruding through holes 59 or 60, penetrates at least one eighth inch (3.2 mm) into a drilled aperture 86, as shown in FIG. 6, on inside threaded surface 87 of adapter flange 85.

Allen set-screws are threaded through both holes 59 and 60, shown threaded through hole 59 on FIG. 5 for simplification purposes. Allen set-screws are of a minimum ½ inch (1.3 cm) nominal diameter.

Top flange 62 is welded at top portion 71 of the tubular, cylindrical portion of the extension 55. Top flange 62 has 12 threaded bolt holes 64 through it, when seeing it in plan, but shown only in section in FIG. 4. These threaded bolt holes 64 have a bolt circle diameter, not shown, that coincides with bolt circle diameter 114, as shown in FIG. 9, of lighting fixture 95 and 105, as shown in FIGS. 7 and 9, respectively. The bolt circle and bolt size are mandated by the F.A.A. specifications, i.e., U.S. Federal Aviation Administration specifications. All features shown on FIG. 9, a plan view, coincide with a plan view, not shown, of FIG. 7 in all respects, i.e., they are substantially identical. Therefore, either lighting fixtures of FIG. 7 or FIG. 8 can be bolted onto top flange 62.

Top flange 62 has opening 67 at an angle 66 of approximately 45 degrees. In addition to accepting lighting fixture 95, as shown in FIG. 7, it also accepts lighting fixture 105, as shown in FIG. 9.

Preferably top flange 62 and tubular cylindrical portion 57 are made of stainless steel. The stainless steel assembly 55 of the present invention provides an alignment adjustments assembly which corrects the problem of corrosion from materials such as corrosive deicing chemicals or by a galvanic action between dissimilar metals between the light bolts and the light support.

Figure 11:
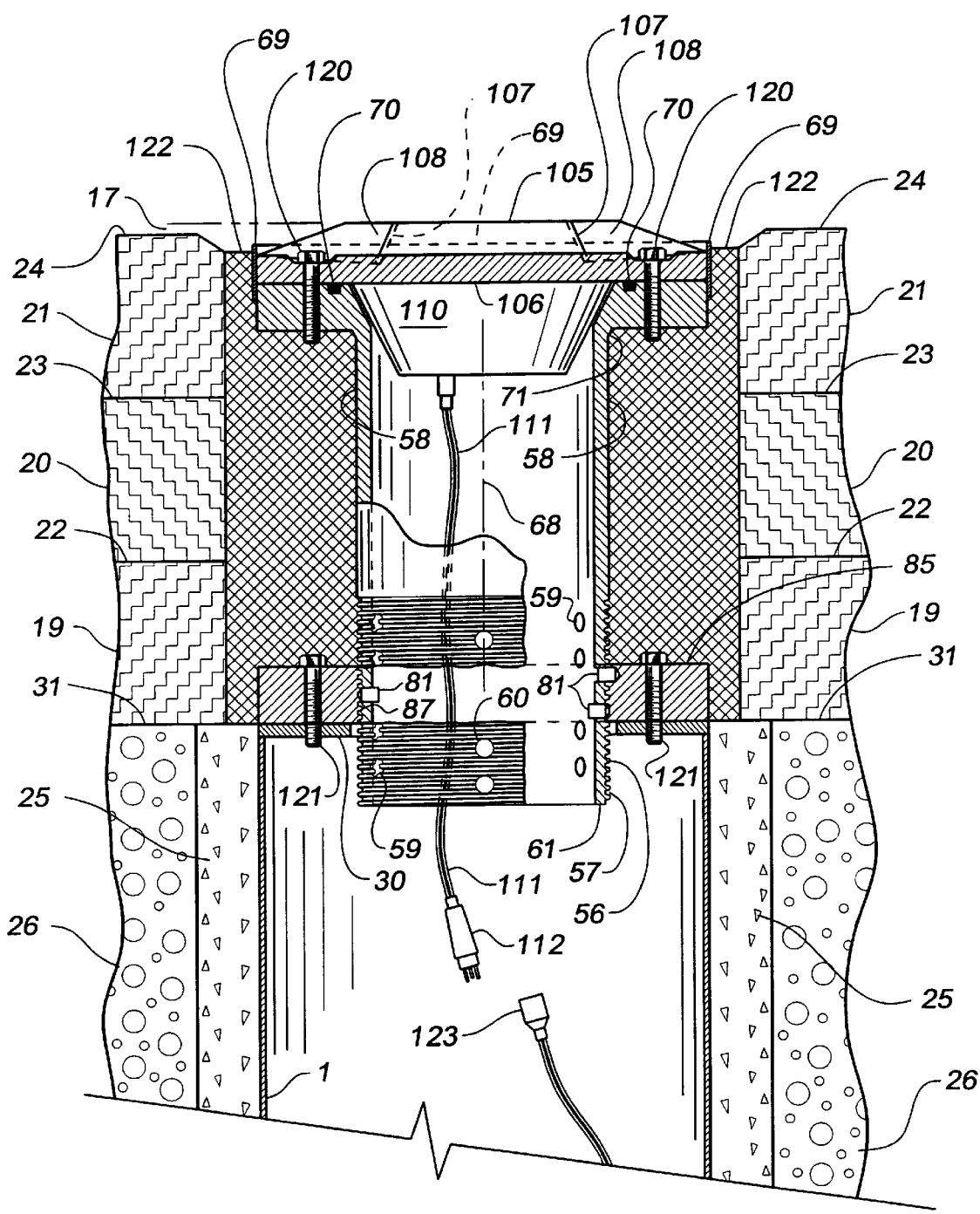
FIG. 11 is an elevation view, partially in section, of the alignments adjustments assembly of the present invention shown installed on an existing embedded container.

Novel mud dam protecting ring 69, consisting of a 1 to 1¼ inches wide (2.54 to 3.27 cm), thin, stainless steel band, is built in one piece with top flange 62, if adjustable extension 55 is built in one piece, which is the preferred method. Mud dam protecting ring 69 can also be welded all around the outer periphery of top flange 62 if adjustable extension 55 is built of individual components. Mud dam 69 is positioned to protect the lighting fixture and its lenses 107, as shown in FIGS. 7, 8, and 9 from grout 122, as shown in FIG. 11, when grout 122 is poured. Groove 65 is provided on surface 63 of top flange 62 in order to accept "O"-ring 70, shown lifted from groove 65, on FIG. 4.

The adjustable extension of the present invention can be cast, in one piece, e.g., from stainless steel, comprising the tubular, cylindrical portion as well as the top flange 62 and mud dam protection ring 69. It can then be machine-finished including groove 65 and mud dam protection ring 69. Acme-threads 56 are cut for a minimum of up to 6 inches (15 cm) or more from bottom end 61. All holes 59, 60, and 64 are then drilled and tapped. Preferably, each individual component is made of stainless steel.

The adjustable extension can also be made of individual components, i.e., a tubular piece, to obtain the cylindrical portion and a standard steel plate, machine-finished to obtain the top flange 62, to which a thin, steel band is welded to make the protection ring 69. Then the flange 62 is welded at 71, top end of non-threaded portion 58 of the tubular piece, i.e., the cylindrical portion. Any additional machine-finishing then is done, including groove 65. Acme threads 56 are cut for a minimum of 6 inches (15 cm) or more from bottom end 61. All holes 59, 60, and 64 are then drilled and tapped.

Optionally, Acme threads 56 could be cut, and holes 59 and 60 drilled and tapped in the field at the point of use.

The order in which the fabrication steps are herein described, i.e., for casting in one piece or for individual components, is not intended to limit the many variations of manufacturing sequencing, as those skilled in the art would recognize. Therefore, all sequencing steps, whether listed or not, are part of the apparatus and method of the present invention.

As it can be readily understood by those skilled in the art, the adjustable extension can be made in any overall length, including any length of its threaded portion 57. This feature provides the design engineers a great advantage in planning for future aircraft ground traffic changes, i.e., additional layers of pavement or the replacement of existing layers of pavement with new, thicker layers, to upgrade these aircraft traffic areas to new generations of larger, heavier aircraft.

FIG. 5 represents the Allen set-screw 81 component of the present invention shown threaded-in and protruding through threaded portion 57 of the adjustable extension.

FIG. 6 represents the circular adapter flange 85 component part of the present invention shown in elevation. Non-threaded aperture 86 is at least ⅛ inch (3.2 mm) deep, drilled into Acme threaded surface 87 in opening 88. Inside opening 88 is threaded with 4 Acme threads per inch (2.54 cm) in order to thread extension 55 into it. Non-threaded holes 89 are 12 in number (only two shown) and are drilled through surface 90. Bolt holes 89 are drilled on a bolt circle, not shown, identical to the bolt circle 137, as shown in FIG. 12, on top flange 30 of conventional embedded container 1, as shown in FIGS. 1 and 2. Adapter flange 85 thereby provides the means for the installation of adjustable extension 55 onto embedded container 1, as shown in FIGS. 11 and 12.

For the installation of the alignments adjustments assembly of the present invention on conventional airport runway embedded containers 1, adapter flange 85 is bolted onto top flange 30, as shown in FIGS. 1, 2, and 12 of embedded container 1 after removing bolts 3, as shown in FIGS. 1 and 2 and all fixed-length extensions 2, 7, and 11. When adapter flange 85 is bolted onto container 1, the adjustable extension 55 can be threaded into adapter flange 85, through Acme threaded opening 88, in order to install an airport inset lighting fixture upon top flange 62, as shown in FIGS. 4 and 11, of adjustable extension 55.

All Allen set screws are threaded through holes 59, 60 of extension 55 and torqued to a minimum of 60 foot-pounds (8 kilogram-meters) against Acme threaded surface 87 of adapter flange 85, one of them, torqued against the inside of drilled aperture 86.

Referring now to FIG. 11, a completed installation of the apparatus of the present invention is represented. Aperture 86 on Acme threaded surface 87 is drilled as follows. First, adjustable extension 55 with "O" ring 70, in groove 65 and with lighting fixture 105 bolted onto it, as shown in FIG. 11, is threaded into adapter flange 85, which has been bolted already onto container 1 by means of bolts 121. Lighting fixture 105 on adjustable extension 55 then is brought to the exact height and azimuth by threading in adjustable extension 55 until azimuth orientation arrows 113 are aligned to the precise azimuth at the required height. Prior to any installation, a surveyor provides the necessary centerline marks 138, as shown in FIG. 12, on the pavement, i.e., of a runway, for aiding the installer in finding the correct azimuth line. At this point, the lighting fixture is removed, and all required Allen set-screws are installed through holes 59, 60 of adjustable extension 55 and fully torqued at 60 foot-pounds (8 kilogram-meters) against Acme threaded surface 87 to immobilize adjustable extension 55 in place, keeping it at the desired azimuth alignment and height adjustment. Then, aperture 86 is drilled approximately ⅛ inch (3.2 mm) into surface 87 of adapter flange 85, through one of threaded holes 59 or 60 of the adjustable extension 55. Immediately after aperture 86 is drilled-in, the remaining Allen set-screw 81 is threaded through the respective hole 59 or 60 and fully torqued at 60 foot-pounds (8 kilogram-meters) against the inside of aperture 86. By making at least one Allen set-screw 81 penetrate at least ⅛ inch (3.2 mm) into aperture 86, on surface 87 of adapter flange 85, by installing six Allen set-screws, and by making the set-screw ½ inch (12.7 mm) in diameter, the adjustable extension 55 and the lighting fixture mounted thereupon will not be made to turn by the torque tangentially applied by the force of airplane wheels, including those of the newer, heavier airplanes landing upon the lighting fixtures or by the twisting action created by heavy aircraft locked wheels when turning. All holes 59, 60 not utilized are plugged-in with threaded, plastic plugs, not shown. When holes 59, 60 are plugged-in, the lighting fixture is connected to electrical power connector 123 from imbedded container 20 1 by means of cable 111 and connector 112. Then the lighting fixture is re-bolted onto top flange 62 of adjustable extension 55 with its azimuth orientation arrows 113 aligned in azimuth, by means of bolts 120. "O" ring 70 is compressed by the bolting pressure, thereby providing a tight water seal. Angled bottom 110 of lighting fixture 105 fits very well in angled 66 opening 67, as shown in FIG. 4, of the adjustable extension.

At this point, the installation is completed by pouring-in grout 122 all around the alignments adjustments assembly 55, 85, of the present invention. It can be seen that the novel protection ring 69, as shown in FIGS. 4 and 11, prevents grout 122 from getting on the lighting fixture, especially so on its lens 107 through window 108. It is also readily understood that groove 65, as shown in FIG. 4, provided on surface 63 of top flange 62 of adjustable extension 55 eliminates the requirement for installing a separate spacer ring with a groove on it for the installation of "O" ring 70.

The alignments adjustments assembly of the present invention is reusable. When the alignments adjustments assembly is installed and the airport aircraft ground traffic area is modified, creating a higher or lower surface, i.e., if surface 24 were made higher or lower, extension 55 can be threaded in or out, after first removing all Allen set-screws 81, to provide a new height adjustment without affecting the azimuth alignment. Azimuth is a straight line, i.e., toward the horizon, in the direction of aircraft landings, with the centerline 138, as shown in FIG. 12, of the aircraft ground traffic area runway, taxiway, defining this straight line. Thus the embedded containers with their inset lights mounted thereupon all are installed at a specified distance one from another on this centerline for the length of the aircraft ground traffic area.

At the time embedded container 1 is first installed, its top flange 30, as shown in FIG. 12, is aligned in azimuth, by aligning centerline 138 of the aircraft ground traffic area to pass exactly aligned with two diametrically opposed threaded bolt holes 136. Prior to its installation, a surveyor provides markings on the pavement for aiding in the azimuth alignment of container 1, as shown in FIG. 1. Bolt holes 136 are at an angle 135 of 30 degrees apart, and they are set on bolt circle 137 with a diameter identical to bolt circle 114, as shown in FIG. 9, on the lighting fixtures 95, 105. Bolt circle diameter 137 on top flange 30 also is identical to the bolt circle diameter, not shown, on adapter flange 85, which bolts thereupon, by the method of the present invention.

Adjusting the height of adjustable extension 55 would not affect the azimuth alignment of a lighting fixture installed upon its flange 62, as shown in FIG. 11, because extension 55 Acme threaded portion 57 is provided with at least four Acme threads 56 per inch (2.54 cm). At four Acme threads per inch (2.54 cm), it would take four full, 360 degree turns of adjustable extension 55, for it to go up or down one inch (2.54 cm). Therefore the adjustable extension will move up or down only ¼ inch (6.3 mm) when rotated 360 degrees about its axis 68, i.e., one single, complete rotation. A 30 degree turn of adjustable extension 55 will produce a height change of only 0.0208 inches (0.05 mm), up or down, i.e., one twelfth of ¼ inch (6.3 mm). The measure of 0.0208 inches (0.05 mm) is slightly more than 1/64 inch (1.6 mm). The overall tolerance 17, as shown in FIG. 1 is 1/16 inch (1.6 mm). A 30 degree turn equals one twelfth of one full 360 degree rotation. Therefore, adjustable extension 55 can be rotated a few degrees about its axis 68 in any direction to obtain a very precise azimuth alignment without negatively affecting its height adjustment. Any azimuth alignment adjustment would always be 15 degrees or less because bolt holes 109, as shown in FIG. 9, of the lighting fixtures, by FAA mandate, are spaced apart 60 degrees, i.e., only six holes. Bolt holes 64 on top flange 62, as shown in FIG. 4, are spaced at 30 degrees, exactly the same as bolt holes 136, as shown in FIG. 12, on top flange 30 of the embedded container, i.e., 12 bolt holes, also by FAA specifications. The diameter of bolt circles 114, as shown in FIG. 9, and 137, as shown in FIG. 12, are also identical to that of the top flange 62. Accordingly, a 30 degree azimuth alignment adjustment is obtained by properly positioning the lighting fixture upon top flange 62 of adjustable extension 55, matching its bolt holes 109 with the two bolt holes 64 on flange 62, positioning arrows 113 closest to the correct azimuth alignment marked on the pavement by a surveyor. The final, precise adjustment of 15 degrees or less is done by simply turning the adjustable extension. From FIG. 9, it can be seen that windows 108 are centered between two bolts 109, and, therefore, orientation arrow 113 is at 30 degrees apart from the two adjacent bolt holes 109.

Referring now to FIGS. 13 and 14, a universal top adjustable alignment container 255 is shown in elevation in FIG. 13 and in plan view, i.e. top view, in FIG. 14. The non-corrosive top adjustable alignment container 255 is another preferred embodiment of the present invention.

FIG. 13 shows, for the purpose of illustration, an airport inset light 205, a new type of airport inset lighting fixture, manufactured by Hughes Phillips. The novel features of the universal top adjustable alignment container 255 allow the installation of any of the three types of lighting fixtures that exist in the U.S. market today, e.g., lighting fixture 95, shown in elevation in FIG. 7 and in plan view in FIG. 9; lighting fixture 105, shown in elevation in FIG. 8 and in plan view in FIG. 9; and the newest inset lighting fixture 205, shown in elevation in FIG. 13.

Any of the three lighting fixtures 95, 105, and 205 can be installed on the universal top adjustable alignment container 255 without requiring its top flange 262 to have an angled opening 66 (FIG. 4), as it is required for the flange 62 of the adjustable extension 55 of FIG. 4.

Continuing to refer to FIG. 13, the novel top flange 262 of the universal top adjustable alignment container 255 has an opening 267 with a straight inside surface 266 instead of an angled inside surface 66 as shown in FIG. 4. In addition, the top flange 262 is thicker than the top flange 62 of FIG. 4. This additional thickness allows a stepped bottom 201 of the lighting fixture 205 to be perfectly fit inside the opening 267 of the top flange 262, with a flange 206 inside the mud dam 269.

The universal top adjustable alignment container 255 of FIG. 13 is preferably cast in one piece, in stainless steel. The casting can then be machined to form the top flange 262, a flat surface 263, with a groove 265 in it, the mud dam 269, and an opening 267, with its straight surface 266. Twelve threaded holes 264 (only two shown) are drilled and tapped through the surface 263 of the flange 262. Then acme threads 256 are cut, at four threads per inch, on a surface 257 for a minimum of six inches from a bottom a 261 of a tubular section 257. The tubular section 257 is of a required wall thickness 274 to allow for the required strength of the threads to resist shearing forces created by the axial loading forces applied upon the lighting fixtures by landing aircrafts. At this point, holes 259 and 260 are drilled and tapped through the tubular section 257, through its wail thickness 274.

Holes 259 and 260 are intercalated, i.e., staggered. These holes 259 and 260, if required, could be drilled and tapped in the field instead of in the factory. Nevertheless, drilling and tapping holes 259 and 260 in the field is not the preferred method because it is not cost effective, and it is inefficient.

Threaded bolt holes 264 of the top flange 262 are a total of twelve, i.e., at 30 degrees 235 from each other, as shown on FIG. 14. These holes 264 are drilled and tapped through a surface 263 of the flange 262 on a bolt circle 214 (FIG. 14), which is similar to the bolt circle 114 of FIG. 9, on the lighting fixtures 95 and 105 of FIGS. 7 and 8, respectively.

Bolt holes 209 of lighting fixture 205 are drilled through flange 206 on a bolt circle (not shown) similar to bolt circle 214 on top flange 262. Lighting fixture 205 has six bolt holes (only two shown) spread at sixty degrees apart, similar to the configuration 235 shown of FIG. 9 for lighting fixtures 95, 105. The number of holes, sizes, and degrees apart are all mandated by the FAA, i.e., the Federal Aviation Administration, in specifications known as FAA Circulars.

Lighting fixture 205 of FIG. 13 has a stepped bottom comprising a portion 201 and a portion 200. The portion 200 provides electrical wires 211 that bring electrical power to the lighting fixture 205. Flange 206 is utilized to install the lighting fixture upon surface 263 of top flange 262 of universal Lop adjustable container 255, inside its mud dam 269. Lighting fixture 205, when bolted onto top flange 262, compresses an "O" ring 270 in a groove 265, providing a water tight seal between the lighting fixture 205 and the inside of the universal top adjustable alignment container 255 of FIG. 13.

Lighting fixture 209 has two countersunk windows 208, similar to the countersunk windows 108 on lighting fixtures 95, 105 of FIG. 9. The lighting fixture 205 also has one azimuth orientation arrow (not shown) engraved in each of countersunk windows 208. The countersunk windows 208, engraved azimuth arrows, lighting system, and their angular positioning for all lighting fixtures manufactured in the U.S. are all very similar and they are all mandated by FAA regulations, i.e., FAA Circulars.

Engraved azimuth arrows (not shown) on the lighting fixture 205 are utilized to aid the installer in aligning the lighting fixture 205 in azimuth, on the runway centerline and in the direction 32 of landing aircraft 51 (FIG. 3).

Referring now to FIG. 14, a plan view, i.e., a top view, of the universal top adjustable alignment container 255, of FIG. 13, is shown. FIG. 14 shows the top flange 262, with its mud dam 269 and twelve threaded holds 264 drilled and tapped on the bolt circle 214, at thirty degrees 235 from each other. FIG. 14 also shows groove 265 in surface 263 of top flange 262. Groove 265 is provide for receiving "O" ring 270. In addition, FIG. 14 shows straight surface 266 of inside opening 267 and inside surface 274 of tubular section 257.

The universal top adjustable alignment container of the present invention can also be fabricated of individual components, which can be welded together. By way of an example, top flange 262 can be welded at 271 to the tubular section 257, and mud dam 269 can be made of a piece of thin steel welded to the outer periphery of top flange 262. Any machining including the cutting of acme threads 256 and the drilling and tapping of holes 259, 260, and 264 can be done at the time each component is fabricated or after all or part of the components have been welded together.

Whether cast in one piece or fabricated of individual components, the universal top adjustable alignment container 255 preferably is made of stainless steel, to provide for corrosion resistance.

The alignments adjustments precision makes the apparatus of the present invention an efficient and economical apparatus and method for the replacement of conventional, existing fixed-length extensions at the time of renovation, i.e., resurfacing of aircraft ground traffic areas, as well as for new installations of such traffic areas by eliminating the need for installing fixed-length extensions, by eliminating the need for installing several flat spacer rings of various thicknesses, by eliminating the need for installing and angle-correcting, tapered spacer rings, i.e., leveling rings, and by eliminating the need for installing a separate mud dam. In addition, the installation of alignments adjustments assembly of the present invention saves labor costs, and the assembly is reusable.

Thus it can be seen that the invention accomplishes all of its objectives.

The apparatus and process of the present invention are not limited to the descriptions of specific embodiments presented hereinabove, but rather the apparatus and process of the present invention should be viewed in terms of the claims that follow and equivalents thereof. Further, while the invention has been described in conjunction with several such specific embodiments, it is to be understood that many alternatives, modifications, and variations will be apparent to those skilled in the art in light of the foregoing detailed descriptions. Accordingly, this invention is intended to embrace all such alternatives, modifications, and variations which fall within the spirit and scope of the appended claims.

What is claimed is:

1. A stainless steel airport inset light adjustable alignment container set apparatus, comprising:

(a) a light fixture support container base for placement as a partially embedded support for a light fixture in an airport runway, taxiway, or other aircraft ground traffic area;

(b) a light support extension canister having outside screw threading means over at least 6 inches (15 cm) for rotatable attachment to an inside thread on said container base fixture support, and having at least six intercalated vertical rows of threaded holes for receiving Allen set screws rotation locking means for securing said light support extension canister against further rotation; and (c) stainless steel mounting means on said extension canister for holding an airport inset light.

2. A stainless steel airport inset light adjustable alignment container set apparatus as set forth in claim 1, wherein said stainless steel mounting means comprises a top flange and a mud dam protecting ring.

3. A stainless steel airport inset light adjustable alignment container set apparatus as set forth in claim 1, wherein said mud dam protection ring comprises a 1 to 1¼ inches height (2.54 to 3.27 cm) thin, stainless steel band around said top flange.

4. A stainless steel airport inset light adjustable alignment container set apparatus as set forth in claim 3, wherein said stainless steel mud dam protection ring is positioned to protect the lighting fixture and its lenses from grout, when grout is poured.

5. A stainless steel airport inset light adjustable alignment container set apparatus as set forth in claim 4, wherein said top flange has a top flange top surface and a groove on top flange top surface for accepting an "O"-ring.

6. A stainless steel airport inset light adjustable alignment container set apparatus as set forth in claim 1, wherein said light support extension canister has a top flange, a cylindrical non-threaded top portion of up to 12 inches (30 cm) or more between said top flange and said outside screw threading means, and a groove on said top flange for receiving an o-ring positioned between said top flange and said light fixture.

7. A stainless steel airport inset light adjustable alignment container set apparatus as set forth in claim 2, wherein said light support extension canister has a top flange having an inside opening at an angle of about 45 degrees.

8. A stainless steel airport inset light adjustable alignment container set apparatus as set forth in claim 3, further comprising a non-threaded aperture in said inside thread and outside screw threading means for receiving an Allen set screw.

9. A stainless steel airport inset light adjustable alignment container set apparatus as set forth in claim 8, wherein said outside screw threading means comprises an Acme screw thread of at least about 4 threads per inch (2.54 centimeters).

10. A stainless steel airport inset light adjustable alignment container set apparatus as set forth in claim 3, wherein said top flange is stainless steel and said stainless steel mounting means comprises at least one of a plurality of at least 12 bolt holes spaced substantially equally apart and positioned up to 30 degrees apart in said stainless steel top flange.

11. A stainless steel airport inset lights alignment adjustment assembly apparatus, comprising:
  (a) a light fixture support base for placement as a partially embedded light fixture in an airport runway, taxiway, or other aircraft ground traffic area;
  (b) a fixed connecting flange on said light fixture support base for holding an airport inset light;
  (c) an extension adapter flange having connecting means for attachment to said fixed connecting flange on said light fixture support base;
  (d) a stainless steel light support extension canister having outside screw threading means over at least 6 inches (15 cm) from its bottom end for rotatable attachment to an inside thread on said extension adapter flange, and having at least six intercalated vertical rows of threaded holes for receiving Allen set screws rotation locking means for securing said light support extension canister against further rotation; and
  (e) stainless steel mounting means on said extension canister for holding an airport inset light.

12. A stainless steel airport inset light adjustable alignment container set apparatus as set forth in claim 11, wherein said stainless steel mounting means comprises a top flange and a mud dam protecting ring.

13. A stainless steel airport inset light adjustable alignment container set apparatus as set forth in claim 12, wherein said mud dam protection ring comprises a 1 to 1¼ inches height (2.54 to 3.27 cm) thin, stainless steel band around said top flange.

14. A stainless steel airport inset light adjustable alignment container set apparatus as set forth in claim 13, wherein said mud dam protection ring is positioned to protect the lighting fixture and its lenses from grout, when grout is poured.

15. A stainless steel airport inset light adjustable alignment adjustment assembly apparatus as set forth in claim 12, wherein said top flange has a top flange top surface and a groove on top flange top surface for accepting an "O"-ring.

16. A stainless steel airport inset light adjustable alignment adjustment assembly apparatus as set forth in claim 11, wherein said light support extension canister has a stainless steel top flange, a cylindrical non-threaded stainless steel top portion of up to 12 inches (30 cm) or more between said top flange and said outside screw threading means, and a groove on said top flange for receiving an O-ring positioned between said stainless steel top flange and said light fixture.

17. A method of adjusting the height and alignment of an airport inset light, comprising:
  (a) providing a light fixture support for an airport run way, taxiway, or other aircraft ground traffic area, said fixture containing a container base for partially embedded placement in an airport runway, taxiway, or other aircraft ground traffic area and means for holding an airport inset light;
  (b) providing a rotatably adjustable fixture extension to adjust the height and azimuth alignment of said airport inset light supported by said light fixture support, and providing in said rotatably adjustable fixture extension at least six intercalated vertical rows of threaded holes for receiving Allen set screws rotation locking means for securing said light support extension canister against further rotation; and
  (c) providing stainless steel mounting means on said adjustable fixture extension for mounting said airport inset light on said rotatably adjustable fixture extension.

18. A method of adjusting the height and alignment of an airport inset light as set forth in claim 17, wherein said stainless steel mounting means comprises a stainless steel mud dam.

19. A method of adjusting the height and alignment of an airport inset light as set forth in claim 17, comprising providing a stainless steel mud dam protection ring.

20. A method of adjusting the height and alignment of an airport inset light as set forth in claim 17, wherein said mounting means comprises a stainless steel mud dam consisting of a 1 to 1¼ inches height (2.54 to 3.27 cm), thin, stainless steel band around a top flange.

* * * * *

UNITED STATES PATENT AND TRADEMARK OFFICE
CERTIFICATE OF CORRECTION

PATENT NO. : 6,196,697 B1  
APPLICATION NO. : 09/514089  
DATED : March 6, 2001  
INVENTOR(S) : Reinert, Sr.

It is certified that error appears in the above-identified patent and that said Letters Patent is hereby corrected as shown below:

Title page, Item (63) Related U.S. Application Data, and Column 1, first paragraph, delete the existing related data and insert the following therefor:

-- Continuation-in-part of application No. 09/113,980, filed on July 10, 1998, now Pat. No. 6,033,083, which is a continuation-in-part of application No. 08/687,809, filed on July 26, 1996, now Pat. No. 5,779,349, which is a continuation-in-part of application No. 08/002,014, filed on January 8, 1993, now Pat. No. 5,541,362, and a continuation-in-part of application No. 08/058,356, filed on May 10, 1993, now Pat. No. 5,594,201, and a continuation-in-part of application No. 08/464,736, filed on June 29, 1995, now Pat. No. 5,785,409, which is the National Stage under 35 U.S.C. §371 of International Application No. PCT/US93/12640, filed on December 29, 1993. --

Signed and Sealed this  
Twenty-first Day of February, 2012

David J. Kappos  
*Director of the United States Patent and Trademark Office*